US008069257B1

(12) United States Patent
Bhatia et al.

(10) Patent No.: US 8,069,257 B1
(45) Date of Patent: Nov. 29, 2011

(54) UNIVERSAL SERIAL BUS SYSTEM INTERFACE FOR INTELLIGENT PLATFORM MANAGEMENT INTERFACE COMMUNICATIONS

(75) Inventors: Anurag Bhatia, Lilburn, GA (US); Subash Kalbarga, Suwanee, GA (US)

(73) Assignee: American Megatrends, Inc., Norcross, GA (US)

( * ) Notice: Subject to any disclaimer, the term of this patent is extended or adjusted under 35 U.S.C. 154(b) by 757 days.

(21) Appl. No.: 11/434,089

(22) Filed: May 15, 2006

(51) Int. Cl.
G06F 15/16 (2006.01)
(52) U.S. Cl. ........ 709/230; 709/226; 709/203; 370/392; 370/386; 345/501; 710/14; 713/324
(58) Field of Classification Search .................. 709/330, 709/230; 370/330
See application file for complete search history.

(56) References Cited

U.S. PATENT DOCUMENTS

| | | | | |
|---|---|---|---|---|
| 7,197,657 | B1 * | 3/2007 | Tobias | 713/400 |
| 7,305,494 | B2 * | 12/2007 | Lee | 710/10 |
| 7,424,419 | B1 * | 9/2008 | Fike et al. | 703/23 |
| 2002/0012329 | A1 * | 1/2002 | Atkinson et al. | 370/330 |
| 2003/0131136 | A1 * | 7/2003 | Emerson et al. | 709/250 |
| 2004/0221015 | A1 * | 11/2004 | Sun et al. | 709/207 |
| 2005/0049848 | A1 * | 3/2005 | Dai | 703/24 |
| 2005/0182843 | A1 * | 8/2005 | Reistad et al. | 709/230 |
| 2006/0123189 | A1 * | 6/2006 | Bitner et al. | 711/111 |
| 2006/0143344 | A1 * | 6/2006 | Lindsay et al. | 710/105 |
| 2007/0011491 | A1 * | 1/2007 | Govindarajan et al. | 714/27 |
| 2007/0174033 | A1 * | 7/2007 | Huang et al. | 703/24 |
| 2007/0206630 | A1 * | 9/2007 | Bird | 370/465 |
| 2007/0233455 | A1 * | 10/2007 | Zimmer et al. | 703/27 |
| 2009/0077280 | A1 * | 3/2009 | Anderson et al. | 710/62 |

OTHER PUBLICATIONS

Intel, Hewlett-Packard, NEC, Dell, "-IPMI- Intelligent Platform Management Interface Specification v 1.5", Feb. 2002, Document Revision 1.1.*
Intel, Hewlett-Packard NEC Dell, -IPMI-, Intelligent Platform Management Interface Specification v2.0, Feb. 2004.*
Network World, "IPMI (Intelligent Platform Management Interface)", 2003.*
Raritan, "The first KVM-over-IP chip that supports Virtual Media, IPMI and more", 2006.*
Gunning, "Multiservice Ethernet access", Apr. 2006.*
Hargrave, "An Introduction to the Intelligent Platform Management Interface", 2004.*
Intel, Hewlett-Packard NEC Dell, Intelligent Platform Management Interface Specification Second Generation, Document Rev. 1.0, Feb. 12, 2004, May 5, 2006 Markup, pp. 1-622.

* cited by examiner

*Primary Examiner* — Krista Zele
*Assistant Examiner* — Ondrej Vostal
(74) *Attorney, Agent, or Firm* — Tim Tingkang Xia, Esq.; Morris Manning & Martin, LLP (57) ABSTRACT

Methods, systems, and apparatus are disclosed for utilizing a universal serial bus ("USB") transport as a system interface to transmit and receive IPMI commands and responses. An intelligent platform management interface ("IPMI") transport library is provided that receives IPMI commands from IPMI client applications executing on a host. The IPMI commands are encapsulated into vendor specific small computer systems interface ("SCSI") commands and transmitted over the USB transport to a virtual mass storage device provided by a management device. In response to receiving the vendor specific commands, IPMI firmware executing on the management device extracts the IPMI commands and executes them. A response may be returned to the host by encapsulating the IPMI response into a vendor specific SCSI response and transmitting the response to the host.

5 Claims, 5 Drawing Sheets

UNIVERSAL SERIAL BUS SYSTEM INTERFACE FOR INTELLIGENT PLATFORM MANAGEMENT INTERFACE COMMUNICATIONS

CROSS-REFERENCE TO RELATED APPLICATIONS

This application is related to co-pending U.S. patent application Ser. No. 10/790,160, filed on Mar. 1, 2004, and entitled "Method, System, and Apparatus for Communicating With A Computer Management Device" which is expressly incorporated herein by reference in its entirety.

BACKGROUND OF THE DISCLOSURE

Computers are often linked together through networks to allow the resources of a computer at one location to be utilized by users located at a different location. In a distributed environment such as this, computers known as servers perform various tasks for client computers that communicate with the servers over a network. Servers enable sharing of files and other resources between client computers and the server. As an example, a world wide web ("web") server may provide text, graphics, and other resources to client computers over the Internet.

It is often necessary to manage the operation of a server computer. For instance, it is often desirable to view information regarding the relative health of a server computer. This is especially true for server computers that maintain resources that are utilized by a large number of client computers, such as within a corporate network or the internet. For many conventional systems, the technician that needs to view the screen displays and interact with the server being managed is required to be physically located at the site of the server. However, it is not always feasible for a technician to be physically present at the location of the server computer.

For example, a system administrator of a corporate network may be present at one location while the servers of the corporate network may be spread around the country or even the globe. To effectively manage the servers on the corporate network, the system administrator must be able to monitor each of the server computers, regardless of their location. Because the system administrator cannot be physically present at each server to be managed, effective management of the server computers becomes very difficult if not impossible. As a result, it can be very costly to maintain servers located in disparate physical locations.

Some systems for remotely administering server computers utilize an integrated or add-in management device. Such a management device can provide remote access to detailed information regarding the health and status of a managed server computer. In some cases, the management device can also redirect the video output from the server computer to a remote location and allow keyboard and mouse input to be provided to the server from the remote location. In some implementations, the management device may also include a baseboard management controller ("BMC"). In general, a BMC is a microcontroller that monitors the health and operation of the computer. In one implementation, a BMC monitors health-related aspects associated with the computer such as the temperature of components within the computer, the speed of rotational components (e.g., spindle motor, CPU fan, etc.) within the system, the voltage across or applied to one or more components within the system, and the available or used capacity of memory devices within the system. Other parameters may also be monitored.

In order to make the data gathered by the BMC available to programs and to other computer systems, a standard called the Intelligent Platform Management Interface ("IPMI") has been created. IPMI is an industry standard for system monitoring and event recovery. The IPMI specification provides a common message-based interface for accessing all of the manageable features in a compatible computer. IPMI includes a rich set of predefined commands for reading temperature, voltage, fan speed, chassis intrusion, and other parameters. System event logs, hardware watchdogs, and power control can also be accessed through IPMI. In this manner, IPMI defines protocols for accessing the various parameters collected by a BMC through an operating system or through an external connection, such as through a network or serial connection.

In order for an IPMI client application to transfer IPMI messages to a BMC, one of several system interfaces must be utilized. For instance, if an IPMI client application executing on a managed server desires to transmit information to a BMC regarding current CPU usage, the IPMI client application must utilize a system interface to do so. IPMI, however, defines only three possible system interfaces: a keyboard controller style ("KCS") interface; a system management interface chip ("SMIC") interface; and a block transfer ("BT") interface. Each of these interfaces, however, requires that additional hardware be present on the management device or within the monitored computer system. This hardware adds to the cost of the computer system or management device. Additionally, these interfaces can be very slow. In particular, KCS interfaces are based on a legacy keyboard controller interface that is extremely slow. Unfortunately, no other communications channels are supported by IPMI for use as a system interface.

It is with respect to these considerations and others that the present disclosure has been made.

SUMMARY OF THE DISCLOSURE

As discussed in greater detail herein, the above and other problems are solved by a method, system, apparatus, and computer-readable medium for providing a universal serial bus ("USB") system interface for IPMI communications. Utilizing the disclosure provided herein, transports that are unsupported by IPMI for use as a system interface, such as the USB transport, may be utilized as a system interface to transmit and receive IPMI commands and responses.

According to one aspect, an improved management device is provided. The management device provided herein is operative to communicate with a host computer over a standard communication link, such as a USB connection. To enable communication between the host computer and the management device, the management device emulates a standard device on the communication link. For instance, according to one embodiment, the management device is operative to emulate a standard mass storage device, such as a CD-ROM device, on the communication link. Because the device is a standard device, the operating system of the host computer can utilize a standard operating system driver to communicate with the emulated device. No custom hardware driver is necessary to communicate with the device emulated by the management device on the communication link.

According to one aspect, the emulated mass storage device can be utilized to redirect the contents of a mass storage device connected to the remote computer to the host computer. Through the use of program code executing on the management device and the remote computer, the contents of a mass storage device physically connected to the remote computer, such as a CD-ROM device, can be made available to the host computer. In particular, program code executing on the management device exposes the contents of the mass storage device of the remote computer to the host computer through the emulated mass storage device on the communication link. All read and write requests from the host computer are intercepted by the management device and relayed over the network to the remote computer. From the perspective of the host computer, the emulated device appears no different than a physical device actually connected to the host computer.

According to another aspect, the emulated device provided by the management device on the communications link can be utilized for out-of-band communication between the host computer and the management device. In particular, the communications link can be utilized to exchange IPMI commands and responses between the host computer and the management device. In order to provide this functionality, an IPMI transport layer is provided at the host computer. The IPMI transport layer receives IPMI commands from IPMI client applications executing on the host computer. The IPMI transport layer encapsulates the IPMI commands in vendor specific commands that conform to a second communication standard and transmits the vendor specific commands to the management device over the communication link. For instance, according to one implementation, the IPMI transport layer encapsulates the IPMI commands into a vendor specific small computer system interface ("SCSI") command. The vendor specific SCSI command is then transmitted over a USB connection to the emulated mass storage device in order to perform out-of-band communication with the management device.

When the management device receives vendor specific commands destined for the emulated device, IPMI firmware executing on the management device determines whether the commands are actually intended for the emulated device, such as a read or write command, or whether the commands are vendor specific commands intended for out-of-band communication with the management device. If the commands are actually intended for communication with the emulated device, these commands are processed in a manner that allows the host computer to communicate with the emulated device. If the commands are intended for communicating with the management device itself, the commands are intercepted and utilized by the management device for the requested purpose. In particular, the IPMI firmware on the management device extracts the IPMI command from the vendor specific command and performs the requested command. The management device may generate IPMI responses encapsulated in vendor specific SCSI commands and transmit the responses to the host computer in a similar fashion. In this manner, a USB transport can be utilized as a system interface for exchanging IPMI commands between an IPMI client application and a management device.

According to another aspect, the host computer is operative to expose a KCS pseudo library to IPMI client applications executing on the host. The KCS pseudo library receives KCS formatted commands from the IPMI client applications executing on the host intended for communication with the management device. The KCS pseudo library reformats the commands so that they are compatible with the IPMI transport library and passes the reformatted commands to the IPMI transport library for relaying to the management device. In this manner, the IPMI client applications do not need to be reconfigured to utilize USB as a transport for IPMI messages.

According to various aspects of the disclosure presented herein, a method, a computer-controlled apparatus, and a computer-readable medium having instructions capable of performing the various embodiments described herein are also provided. These and various other features as well as advantages of the disclosure presented herein will be apparent from a reading of the following detailed description and a review of the associated drawings.

DETAILED DESCRIPTION

As described briefly above, the embodiments described herein provide methods, apparatus, and computer-readable media for enabling the use of a USB transport as a system interface for exchanging IPMI commands and responses between a host and a management device. In the following detailed description, references are made to the accompanying drawings that form a part hereof, and in which are shown by way of illustration specific embodiments or examples. These embodiments may be combined, other embodiments may be utilized, and structural changes may be made. The following detailed description is, therefore, not be taken in a limiting sense, and the scope of the present invention is defined by the appended claims and their equivalents.

Figure 1:
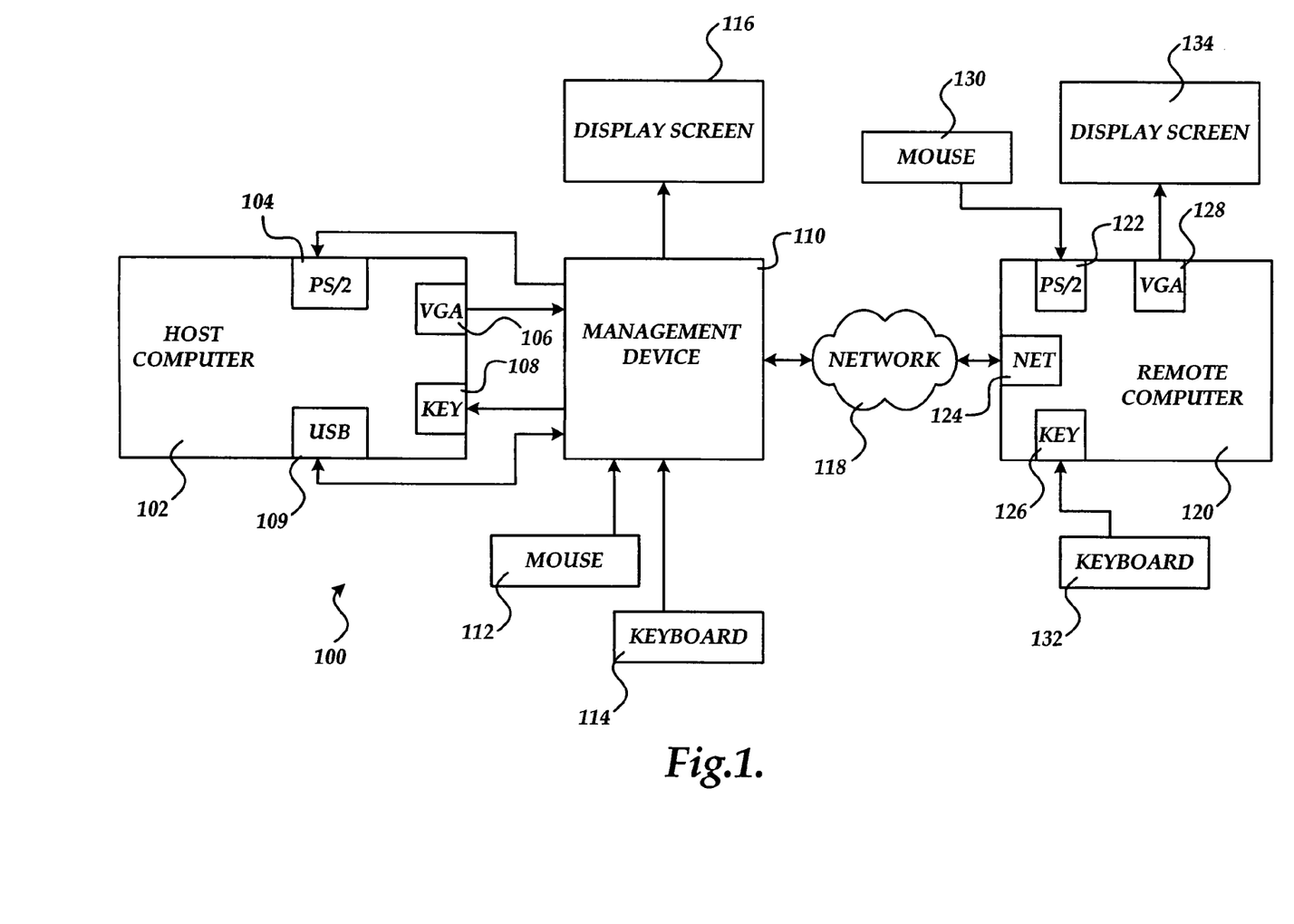
FIG. 1 is a network diagram illustrating an operating environment for the implementations presented herein that allows a USB transport to be utilized as a system interface for communicating with a management device.

Referring now to the drawings, in which like numerals represent like elements throughout the several figures, aspects of an illustrative operating environment an several implementations will be described. FIG. 1 and the following discussion are intended to provide a brief, general description of a suitable computing environment in which the disclosure presented herein may be implemented. While the embodiments described herein will be discussed in the general context of enabling communication between a host computer and a management device, those skilled in the art will recognize that the embodiments presented herein may also be implemented in combination with other computer systems and program modules.

Generally, program modules include routines, programs, components, data structures, and other types of structures that perform particular tasks or implement particular abstract data types. Moreover, those skilled in the art will appreciate that the implementations presented herein may be practiced with other computer system configurations, including hand-held devices, multiprocessor systems, microprocessor-based or programmable consumer electronics, minicomputers, mainframe computers, and the like. The implementations presented herein may also be practiced in distributed computing environments where tasks are performed by remote processing devices that are linked through a communications network. In a distributed computing environment, program modules or data files may be located in both local and remote memory storage devices.

Turning now to FIG. 1, a general operating environment for the implementations presented herein will be described. As shown in FIG. 1, a system 100 is provided that includes a host computer 102 that is to be remotely managed. A management device 110 (also referred to alternately as a "redirection device", an "interaction device", or "management hardware") is interposed between a network 118 and the host computer 102. A remote computer 120 is linked to the network 118, and the host computer 102 may or may not be linked to the same network 118 or another network not shown. The network 118 may be of various forms such as a local area network ("LAN") or wide area network ("WAN") including the interne. A user located at the remote computer 120 may remotely manage aspects of the operation of the host computer 102 via the network 118 and the management device 110.

The management device 110 may be linked to the host computer 102 through several input/output ("I/O") connections of the host computer 102. Generally, a host computer 102 will have a video display output 106, such as an analog or digital video graphics array ("VGA") output. Also, the host computer 102 typically includes a PS/2 port or ordinary serial port configured as a mouse port 104, a keyboard port 108, and may also include a universal serial bus ("USB") port 109.

The video display output 106 provides a signal that ordinarily is passed directly to a display screen or monitor 116 where screen frames are displayed for a user present at the host computer 102. However, in the embodiment shown, the video display output 106 provides a video signal to a video input of the management device 110. The management device 110 then passes the video signal through a video output to the display screen 116 where a normal video display of screen frames occurs. Additional details regarding the operation of the management device 110 and its operations upon the video signal are described in U.S. patent application Ser. No. 10/247,876, entitled "Systems and Methods for Establishing Interaction Between A Local computer and a Remote Computer", which is assigned to the assignee of the instant patent application and expressly incorporated herein by reference.

User input devices may also be provided for the host computer 102, including a local mouse 112 and local keyboard 114. Conventionally, the local mouse 112 and local keyboard 114 would be directly connected to the mouse port 104 and keyboard port 108 of the host computer 102. However, for the embodiment shown, the local mouse 112 and local keyboard 114 are connected to a mouse port and keyboard port, respectively, of the management device 110 and provide mouse and keyboard data to the management device 110 through these connections. The management device 110 then passes the mouse data and keyboard data to the respective ports of the host computer 102.

In addition to providing the pass-through of the video signal to the display screen 116, the management device 110 captures screen frame data from the video signal and transfers the screen frame data across the network 118 to the remote computer 120. The remote computer 120 has a network interface 124 linking the remote computer 120 to the network 118. The network interface 124 used by the remote computer 120 may be of various forms such as a dial-up modem or an Ethernet connection to a LAN. Various protocols of data transfer may be utilized between the management device 110 and the remote computer 120, such as the TCP/IP protocol ordinarily used via the Internet.

The remote computer 120 implements an application, such as a dedicated application or plug-in executing within a general purpose browser window such as a web browser, for receiving the screen frame data through the network interface 124 and providing a display on the display screen 134. The display includes the screen frame data produced by the host computer 102 that corresponds to the screen frame data transferred by the management device 110. Typically, the remote computer 120 includes a video adapter that has a video output 128 connected to the display screen 134 to provide the video signals.

To allow the user of the remote computer 120 to fully interact with the host computer 102, user interface devices such as a mouse 130 and keyboard 132 are connected to a mouse port 122 and keyboard port 126, respectively, of the remote computer 120. The user manipulates the mouse 130 and keyboard 132 to interact with the screen frame shown on the display screen 134, which may be formed wholly or in part by the screen frame data received over the network 118. When the user activity at the remote computer 120 is entered with respect to the screen frame data received from the management device, then the processing device of the remote computer 120 transfers the user activity data over the network 118 to the management device 110 that subsequently passes it to the mouse port 104 and/or keyboard port 108.

Once the host computer 102 receives the user activity data through the mouse port 104 and/or keyboard port 108, the host computer 102 then implements the user activity as if it had occurred directly through the local mouse 112 or local keyboard 114. When implemented, the user activity alters the screen frame to be displayed. Therefore, the video signal output by the video connector 106 to the management device 110 provides the screen frames that show the change caused by the user activity at the remote computer 120, such as the mouse pointer moving or typed letters appearing in an electronic document.

The management device 110 transfers the screen frame data showing the user activity to the remote computer 120 where it is then provided to the display screen 134. Thus, the user activity initially performed at the remote computer 120 is represented on the display screen 134 immediately as it is being performed by the user and then once again after updating the video display of the host computer 102 and transferring the updated screen frame back to the remote computer 120.

In addition to receiving user input, the management device 110 may also provide for additional management with the remote computer 120 by providing a USB connection to a USB port 109 of the host computer 102. The USB connection allows the management device 110 to emulate USB devices for the host computer 102, such as additional mass storage devices including devices that the host computer 102 may use when booting-up. For example, the remote computer 120 may provide a floppy, CD-ROM, or hard disk drive that contains a boot-up sequence to be used by the host computer 102. Upon a connection being established over the network 118 between the management device 110 and remote computer 120, the host computer 102 may boot from a media source of the remote computer 120 with the boot-up sequence provided through the USB port 109.

The USB connection from the management device 110 may also allow a local keyboard and mouse and/or a keyboard and mouse of the remote computer to be emulated for the host computer 102. For example, the host computer 102 may have only USB ports instead of PS/2 ports and the management device 110 outputs mouse and keyboard signals to the host computer through the USB connection.

To establish the USB connectivity discussed above between the management device 110 and the host computer 102, a USB microcontroller may be included as a part of the management device 110. The USB microcontroller communicates with the processing device 220 to emulate a USB node for the host computer 102. Thus, a media source of the remote computer may be accessible by the host computer 102 by the USB microcontroller 234 emulating a USB media device for the host computer 102.

It should be appreciated that the redirection device may comprise a device located internal to the host computer 102 or an external device connected to the external connections of the host computer 110 as shown in FIG. 1. Such a device is described in U.S. patent application Ser. No. 10/247,876, entitled "Systems and Methods for Establishing Interaction Between A Local computer and a Remote Computer", which is assigned to the assignee of the instant patent application and expressly incorporated herein by reference. Another embodiment may comprise a management device 110 that is integrated with the main system board of the host computer 102 or contained on an adapter card located within the host computer 110. Such a device is described in U.S. patent application Ser. No. 10/016,484, entitled "Systems and Methods for Capturing Screen Displays From A Host Computing System for Display At A Remote Terminal", which is also assigned to the assignee of the instant patent application and expressly incorporated herein. It should be appreciated that the physical and logical connections between the various components are essentially the same regardless of whether the management device 110 is located internal to or external from the host computer 102. It should also be appreciated that other configurations may be utilized.

According to other implementations, the management device 110 may also include a baseboard management controller ("BMC"). In general, a BMC is a microcontroller that monitors the health and operation of the host computer 102. In one implementation, a BMC in the management device 110 monitors health-related aspects associated with the computer 102 such as the temperature of components within the computer, the speed of rotational components (e.g., spindle motor, CPU fan, etc.) within the computer 102, the voltage across or applied to one or more components within the computer 102, and the available or used capacity of memory devices within the computer 102. Other parameters may also be monitored.

In order to make the data gathered by the BMC available from the management device 110 to programs executing on the computer 102 and to other computer systems such as the remote computer 120, the firmware of the management device 110 is compatible with the Intelligent Platform Management Interface ("IPMI"). IPMI is an industry standard for system monitoring and event recovery. The IPMI specification provides a common message-based interface for accessing all of the manageable features in a compatible computer. IPMI includes a rich set of predefined commands for reading temperature, voltage, fan speed, chassis intrusion, and other parameters. System event logs, hardware watchdogs, and power control can also be accessed through IPMI. In this manner, IPMI defines protocols for accessing the various parameters collected by a BMC through an operating system or through an external connection, such as through a network or serial connection. Additional details regarding IPMI can be found in the IPMI Specification (Version 2.0), which is publicly available from INTEL CORPORATION, and which is incorporated herein by reference.

In order for an IPMI client application executing on the host computer 102 to transfer IPMI messages to the management device 110, one of several system interfaces must be utilized. For instance, if an IPMI client application executing on the computer 102 needs to transmit information to the management device 110 regarding current CPU usage, the IPMI client application must utilize a "system interface" to do so. The IPMI Specification, however, defines only three possible system interfaces: a keyboard controller style ("KCS") interface; a system management interface chip ("SMIC") interface; and a block transfer ("BT") interface. Each of these interfaces, however, requires that additional hardware be present on the management device or within the monitored computer system. This hardware adds to the cost of the computer system or management device. Additionally, these interfaces can be very slow. In particular, KCS interfaces are based on a legacy keyboard controller interface that is extremely slow. Unfortunately, no other communications channels are supported by IPMI for use as a system interface. As will be described in greater detail below with respect to FIGS. 2-5, the embodiments provided herein allow the USB connection between the host computer 102 and the management device 110 to be utilized as a system interface for transferring IPMI command and response messages.

Figure 2:
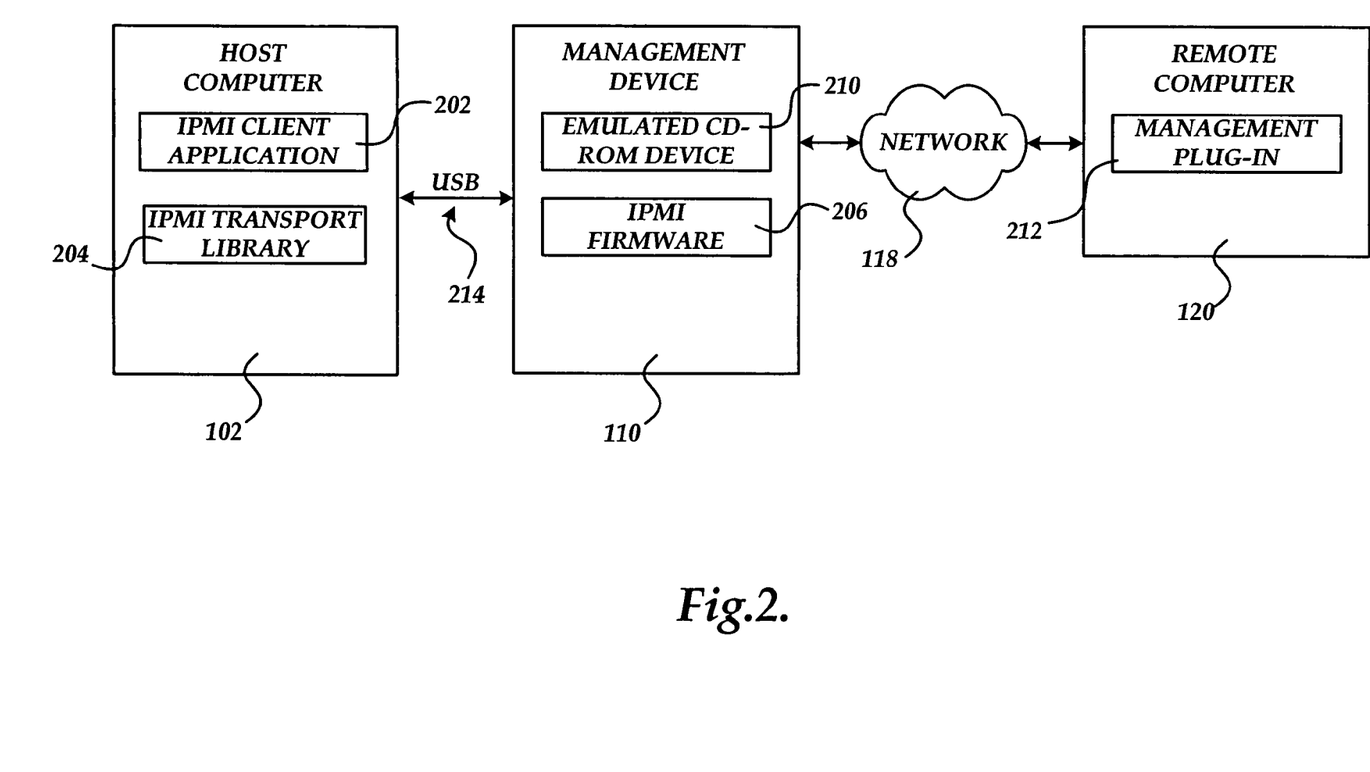
FIG. 2 is a block diagram illustrating aspects of a host computer, management device, and remote computer provided according to the various embodiments described herein.

Referring now to FIG. 2, additional details regarding the operation of the host computer 102, the management device 110, and the remote computer 120 will be described. As described briefly above, the host computer 102 and the remote computer 120 may comprise standard desktop or server computers. The host computer 102 and the remote computer 120 may include many of the convention components of such computer systems, including a central processing unit ("CPU"), a volatile memory, a mass storage device, a display device, input devices such as a mouse and keyboard, and other conventional peripherals (not shown in FIG. 2). The mass storage devices within the host computer 102 and the remote computer 120 and their associated computer-readable media, provide non-volatile storage for the host computer 102 and the remote computer 120, respectively. Although the description of computer-readable media contained herein refers to a mass storage device, such as a hard disk or CD-ROM drive, it should be appreciated by those skilled in the art that computer-readable media can be any available media that can be accessed by the host computer 102 and the remote computer 120.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the host computer 102 and the remote computer 120.

A number of program modules and data files may be stored in the mass storage devices and memory of the host computer 102 and the remote computer 120, including an operating system suitable for controlling the operation of a networked personal or server computer, such as one of the family of WINDOWS operating systems or the MS-DOS operating system from MICROSOFT CORPORATION of Redmond, Wash. Other operating systems may also be utilized, such as the LINUX operating system.

According to various embodiments, the mass storage device of the remote computer 120 may also be operative to store a management plug-in 212. As described briefly above, the management plug-in 212 may comprise a stand-alone program or a plug-in operative to execute within a standard web browser. The management plug-in 212 is operative to decompress the video data transmitted by the management device 110 and to display the video output of the host computer 102 on the remote computer 120. The displayed output may include screen displays generated by the application programs, a basic input/output system ("BIOS"), or the operating system of the host computer 102.

According to aspects, the management plug-in 212 is also operative to receive user input commands, such as mouse cursor movements, mouse button selections, and keyboard commands, generated at the remote computer 120 by a user and to transmit the commands to the management device 110. The management device 110 then receives the user input commands from the plug-in 120 and provides the input commands to the host computer 102 as if the input commands were physically generated by a user at the host computer 102. In this manner, user input commands generated by a user physically located at the remote computer 120 may be passed through to the host computer 102. The management plug-in 212 may also be operative to retrieve and display IPMI data from the management device 110.

The management device 110 comprises a special-purpose hardware device that includes an IPMI-compatible firmware 206 stored in a non-volatile memory for performing the functionality described herein. The management device 110 also includes many of the conventional components of a special-purpose computer system. For instance, the management device 110 may include a CPU, a volatile and non-volatile memory, and an input/output controller for connection to the host computer 102 and the network 118 as described herein. For instance, the management device 110 may include a USB hub controller for connecting to the host computer 102 via the USB communication link 214. It should be appreciated that other types of communication links may be utilized for enabling communication between the host computer 102 and the management device 110, such as PCI, IEEE-1394, USB 2.0, and others.

As discussed above, the management device 110 may emulate a mass storage device, such as the emulated CD-ROM device 210, on the USB connection 214. The emulated CD-ROM device 210 may be utilized to redirect the contents of a mass storage device attached to the remote computer 212 to the host computer 102. The emulated CD-ROM device 120 may also be utilized for providing out-of-band communication of IPMI commands and responses between the host computer 102 and the management device 110. The emulated CD-ROM device 210 appears to the host computer 102 as a standard USB CD-ROM. Accordingly, the operating system executing on the host computer 102 utilizes a standard CD-ROM driver provided by the manufacturer of the operating system utilized on the host computer 102 for communicating with the CD-ROM device 210. No custom hardware drivers are necessary.

As will be discussed in greater detail below, in order to issue an IPMI command to the management device 110, the IPMI client application 202 issues commands to an IPMI transport library 204. The IPMI transport library 204 is an application programming interface ("API") operative to encapsulate the IPMI command into a vendor defined SCSI command. The vendor defined SCSI command is then transmitted over the USB connection 214 to the emulated CD-ROM device 210. When these commands are received at the management device 110, the IMPI firmware 206 receives the commands and examines them to determine whether the commands are actually intended for the emulated CD-ROM device 210, such as read and write commands. If the commands are instead IPMI commands intended for the IPMI firmware 206, the IPMI firmware 206 extracts the IPMI command from the vendor specific SCSI command and performs the requested IPMI command. An IPMI response may be generated by the IPMI firmware 206 by encapsulating the response into a vendor specific SCSI response and transmitting the response via the USB connection 214. In this manner, the host computer 102 can utilize the USB connection 214 to communicate IPMI commands and responses with the management device 110 even though USB is not supported by the IPMI standard as a system interface transport mechanism.

Figure 3:
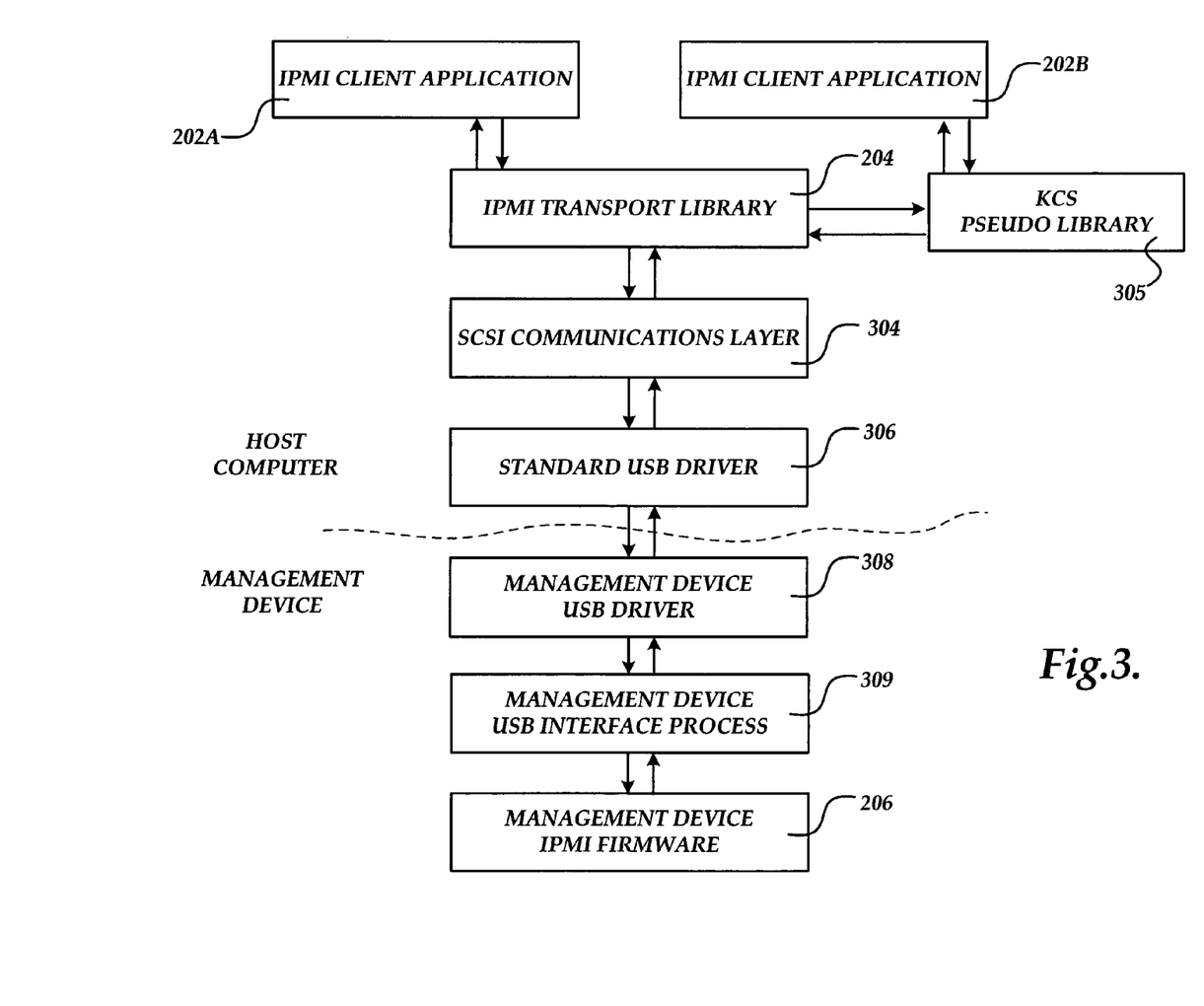
FIG. 3 is a block diagram showing a software architecture for a host computer and a management device presented herein.

Referring now to FIG. 3, aspects of a software architecture utilized on the host computer 102 and the management device 110 for performing the functionality described herein will be presented. As shown in FIG. 3, the IPMI client applications 202A-202B issue IPMI commands to the IPMI transport library 204. As discussed briefly above, the IPMI transport library 204 receives the IPMI commands and encapsulates them into vendor specific SCSI commands. The IPMI transport layer 204 then issues the vendor specific SCSI commands to a SCSI communications layer 304 provided by the operating system of the host computer 102. As described above, these commands are vendor defined SCSI commands that are transmitted over a USB transport mechanism. Other types of transport mechanisms may also be utilized to transmit the SCSI commands. In turn, the SCSI communications layer 102 communicates with a standard USB driver 306 provided by the manufacturer of the operating system executing on the host computer 102. Because a standard driver is utilized, no additional drivers need to be installed on the host computer 102 to enable communication with the management device 110.

In an alternate embodiment, the IPMI client applications 202A-202B may issue IPMI commands to a KCS pseudo library 305 executing on the host 102. The KCS pseudo library 305 is an API that receives KCS formatted commands from the IPMI client applications 202A-202B executing on the host 102 intended for communication with the management device 110. The KCS pseudo library 305 reformats the KCS formatted commands so that they are compatible with the IPMI transport library 204 and passes the reformatted commands to the IPMI transport library 204 for relaying to the management device 110 via the USB connection 214. In this manner, the IPMI client applications 202A-202B can utilize the KCS style interface and do not need to be reconfigured to utilize USB as a transport for IPMI messages.

The USB driver 306 executing on the host computer 102 communicates with a corresponding USB driver 308 executing on the management device 110. The drivers 306 and 308 communicate over the USB physical layer. Commands received at the USB driver 308 are passed in turn to a management device USB interface process 309. The management device USB interface process 309 is responsible for extracting the contents of the vendor specific SCSI command and determining whether the contents are intended for communication with the emulated CD-ROM device 210 or for some other purpose, such as IPMI communication. If an IPMI command is encapsulated in the vendor specific SCSI command, the process 309 extracts the IPMI command and passes the IPMI command to the firmware 206 for execution. It should be appreciated that an IPMI response from the management device 110 to an IPMI application 202A-202B executing on the host computer 102 may be encapsulated into a vendor specific SCSI response by the process 309 and take the reverse path through the USB node 308, the USB driver 306, the SCSI communications layer 304, the IPMI transport library 204, and possibly the KCS pseudo library 305.

Figure 4:
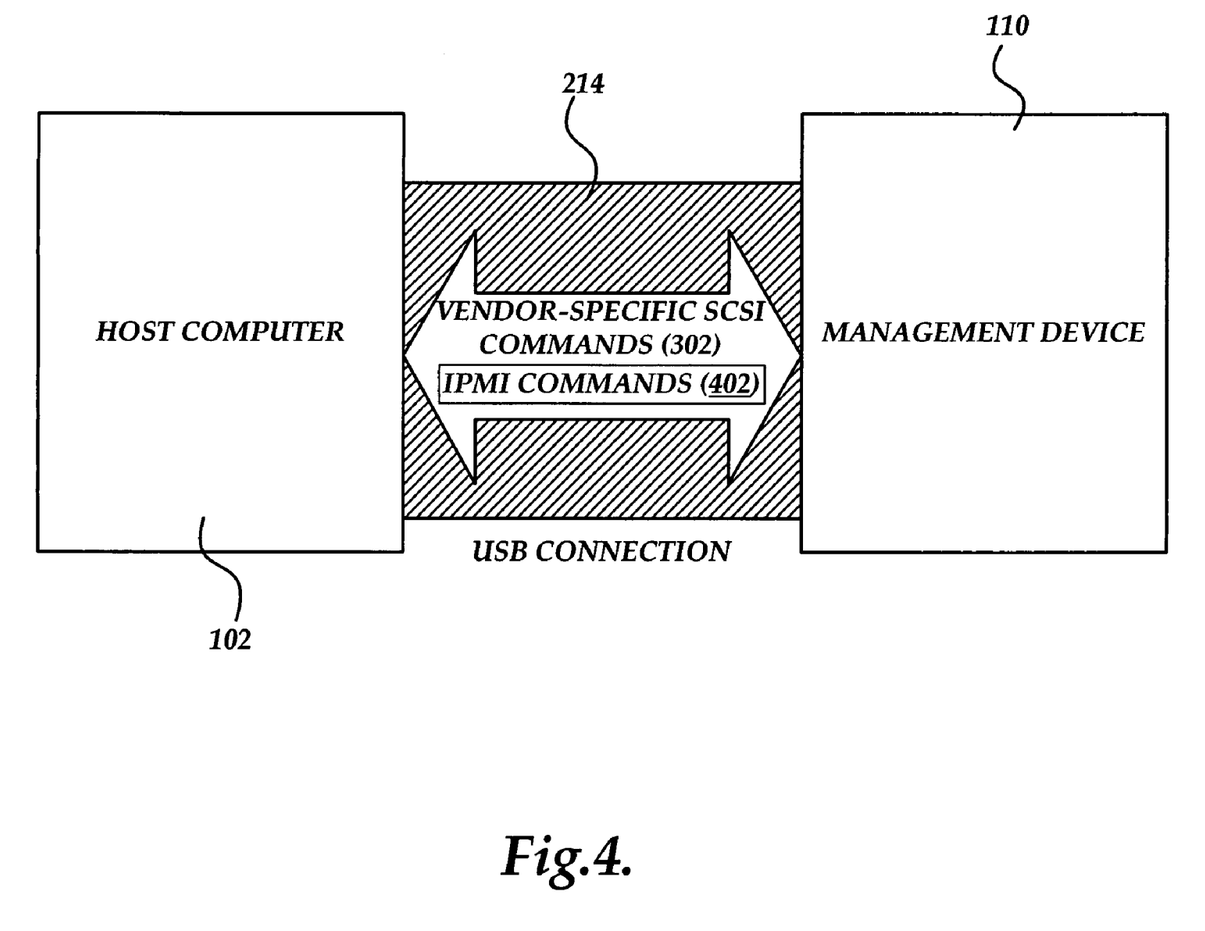
FIG. 4 is a block diagram showing aspects of a communication link between a host computer and a management device according to the embodiments described herein.

Referring now to FIG. 4, additional details regarding the connection between the host computer 102 and the management device 110 will be described. As discussed briefly above, a communication link is established between the host computer 102 and the management device 110 for transmitting out-of-band commands. According to the illustrative embodiment described herein, the communication link comprises a USB connection 214. However, it should be appreciated that the host computer 102 and the management device 110 may communicate over other types of communication links conforming to different standards. For instance, the host computer 102 and the management device 110 may be connected via a FIREWIRE connection or other type of high speed interface known to those skilled in the art.

As discussed above, in order to communicate with the emulated mass storage device on the USB connection 214, the host computer 102 issues vendor specific SCSI commands 302. As known to those skilled in the art, although the communication link between the host computer 102 and the management device 110 comprises a USB connection 214, commands may be defined by a vendor of the management device and transmitted over the USB connection 214 utilizing the SCSI protocol. When issued, these commands are typically ignored by the host computer 102 and passed directly through to the intended device on the USB connection 214. It should be appreciated however, that although SCSI-over-USB commands are utilized in one embodiment, other types of commands conforming to other types of communication standards may also be issued over the communication link between the host computer 102 and the management device 110. As discussed herein, the vendor specific SCSI commands 302 include an IPMI command 402 or response encapsulated therein.

Figure 5:
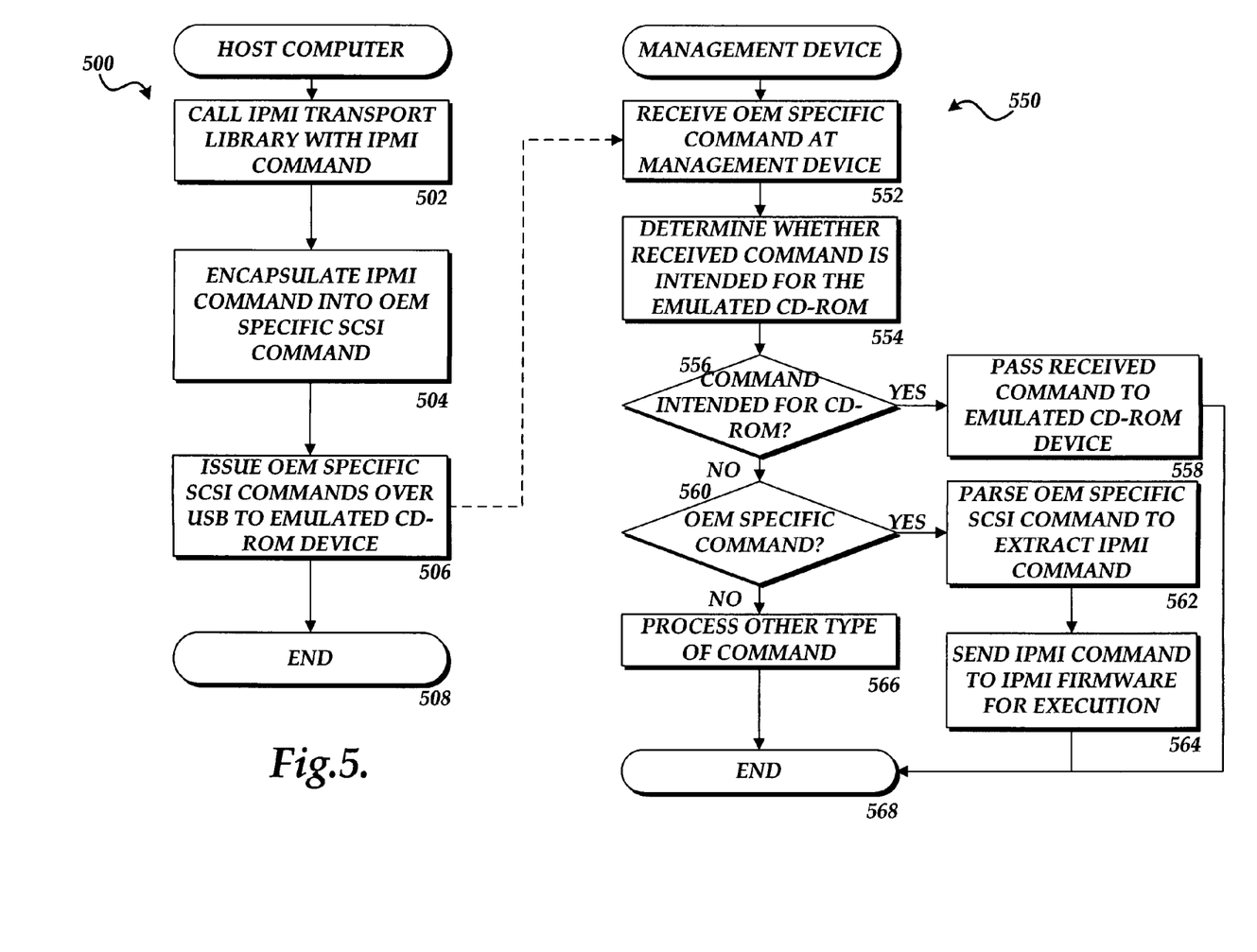
FIG. 5 is a flow diagram illustrating the functional aspects of the operation of a system for enabling the use of USB as a system interface for communicating IPMI commands and responses between a host and a management device.

Turning now to FIG. 5, a flow diagram will be described illustrating one method for utilizing a USB transport as a system interface to transmit and receive IPMI commands and responses. It should be appreciated that the logical operations of the various embodiments described herein, including those shown in FIG. 5, are implemented (1) as a sequence of computer implemented acts or program modules running on a computer system and or (2) as interconnected machine logic circuits or circuit modules within the computer system. The implementation is a matter of choice dependant upon the performance requirements of the implementing computer system.

Accordingly, the logical operations making up the embodiments described herein are referred to variously as operations, structural devices, acts, or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Referring now to FIG. 5, the routines 500 and 550 will be described. The routine 500 illustrates the processing performed by the host computer 102. The routine 550 illustrates the processing performed by the management device 110. The routine 500 begins at operation 502, where an IPMI client application 202 calls the IPMI transport library 204 with an IPMI command. The routine 500 then continues to operation 504, where the IPMI transport library 204 encapsulates the IPMI command into a vendor specific SCSI command. At operation 506, the host computer 102 issues the vendor specific SCSI command over the USB connection 302 to the emulated CD-ROM device. The routine 500 then continues to operation 508, where it ends.

The routine 550 begins at operation 552, where the vendor specific SCSI command is received at the management device 110. The routine 550 then continues to operation 554, where the management device 110 determines whether the received command is intended for the emulated device. In particular, the management device 110 determines whether the command is a read or write command intended for accessing data on the emulated device, or whether the command is a vendor specific command that includes an IPMI command intended for the IPMI firmware 206.

From operation 554, the routine 550 continues to operation 556, where the management device 110 determines whether the received command is actually intended for the emulated CD-ROM device. If the command is intended for the CD-ROM device, the routine 550 branches to operation 558, where the received command is passed to the emulated CD-ROM device. In this manner, the host computer 102 can access the contents of the mass storage device redirected from the remote computer 102 to the management device 110 in the manner described above. From operation 558, the routine 550 continues to operation 568.

If, at operation 556, the management device 110 determines that the received command is not intended for the CD-ROM device, the routine 550 continues to operation 560. At operation 560, the management device 110 determines whether the received command comprises a vendor specific command that includes an IPMI command. If so, the routine 550 branches to operation 562, where the vendor specific SCSI command is parsed to extract the enclosed IPMI command. Once the IPMI command has been extracted, the routine 550 continues to operation 564, where the IPMI command is transmitted to the IPMI firmware 206. The IPMI command is then executed by the IMPI firmware 206. The routine 500 then continues from operation 564 to operation 568, where it ends.

If, at operation 560, the management device 110 determines that the received command is not a vendor specific SCSI command with an enclosed IPMI command, the routine 550 continues to operation 566. At operation 566, any other type of command that is enclosed in the vendor specific SCSI command is executed by the management device 566. For instance, other types of commands may be transmitted in a vendor specific SCSI command for changing the configuration settings of the management device 110. Once the commands have been executed, the routine 550 continues to operation 568, where it ends.

Based on the foregoing, it should be appreciated that the various embodiments of the invention provide methods and systems for utilizing a USB transport as a system interface to transmit and receive IPMI commands and responses. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for communicating with a computer management device, the method comprising:
(a) defining a vendor specific command conforming to the small computer systems interface (SCSI) standard for communicating with the management device, the management device having an intelligent platform management interface (IPMI) firmware and a baseboard management controller configured to monitor health-related aspects of a host computer, and the management device operative to emulate a mass storage device that is operatively accessible to the host computer on a communications link, conforming to the universal serial bus (USB) standard;

(b) encapsulating an IPMI command in the vendor specific SCSI command; and (c) transmitting the vendor specific SCSI command with the encapsulated IPMI command over the USB communications link;

(d) receiving the vendor specific SCSI command at the management device;

(e) determining if the received vendor specific SCSI command is an emulated device command for communicating with the emulated mass storage device, then:

(f) when the received vendor specific SCSI command is an emulated device command for communicating with the emulated mass storage device, passing the vendor specific SCSI command to the emulated mass storage device; and (g) when the received vendor specific SCSI command is not an emulated device command for communicating with the emulated mass storage device, extracting the IPMI command from the vendor specific SCSI command and passing the IPMI command to the IMPI firmware.

2. The method of claim 1, further comprising performing the IPMI command at the IPMI firmware in the management device.

3. The method of claim 2, further comprising:

generating an IPMI response to the IPMI command at the management device encapsulating the IPMI response in a vendor specific response according to the SCSI standard; and transmitting the vendor specific SCSI response over the USB communications link as a response to the vendor specific SCSI command.

4. The method of claim 3, wherein the emulated mass storage device is an emulated USB mass storage device comprising an emulated CD-ROM device.

5. A non-transitory computer-readable storage medium having stored thereon computer executable instructions which, when executed by a processor, cause a management device having a baseboard management controller configured to monitor health-related aspects of a host computer and having an intelligent platform management interface (IPMI) firmware to perform functions comprising:

(a) emulating a mass storage device on a communication link conforming to the universal serial bus (USB) standard;

(b) receiving a vendor specific command over the USB communication link, the vendor specific command conforming to the small computer systems interface (SCSI) standard having an IPMI command encapsulated therein;

(c) determining if the received vendor specific SCSI command is an emulated device command for communicating with the emulated mass storage device, then:

(d) when the received vendor specific SCSI command is an emulated device command for communicating with the emulated mass storage device, passing the vendor specific SCSI command to the emulated mass storage device; and (e) when the received vendor specific SCSI command is not an emulated device command for communicating with the emulated mass storage device, extracting the IPMI command from the vendor specific SCSI command and passing the IPMI command to the IPMI firmware in the management device.

* * * * *